United States Patent
Shaw

[11] Patent Number: 6,161,841
[45] Date of Patent: Dec. 19, 2000

[54] VEHICLE O RING FUEL CAP GASKET

[76] Inventor: Richard J. Shaw, W289 N7882 Park Dr., Hartland, Wis. 53029

[21] Appl. No.: 09/274,083

[22] Filed: Mar. 22, 1999

[51] Int. Cl.⁷ .................................................. F16J 15/02
[52] U.S. Cl. ........................ 277/642; 277/647; 277/648; 277/650; 277/910; 277/944
[58] Field of Search ................... 277/641, 647, 277/650, 648, 910, 530, 574, 642

[56] References Cited

U.S. PATENT DOCUMENTS

| | | | |
|---|---|---|---|
| 3,013,830 | 12/1961 | Milligan . | |
| 3,627,337 | 12/1971 | Pippert . | |
| 3,722,898 | 3/1973 | Von Benningsen . | |
| 3,815,776 | 6/1974 | MacMillan | 220/39 R |
| 3,878,965 | 4/1975 | Crute | 220/203 |
| 4,072,245 | 2/1978 | Sloan | 220/295 |
| 4,102,472 | 7/1978 | Sloan | 220/295 |
| 4,280,346 | 7/1981 | Evans | 70/165 |
| 4,304,339 | 12/1981 | Sakai | 220/209 |
| 4,436,219 | 3/1984 | Reutter | 220/295 |
| 4,460,104 | 7/1984 | Kitsukawa | 220/304 |
| 4,618,154 | 10/1986 | Freudenthal . | |
| 4,765,505 | 8/1988 | Harris | 220/208 |
| 5,167,340 | 12/1992 | Shaw | 220/295 |
| 5,238,136 | 8/1993 | Kasugai et al. | 277/649 |
| 5,312,116 | 5/1994 | Quaglia . | |
| 5,354,072 | 10/1994 | Nicholson . | |
| 5,449,086 | 9/1995 | Harris | 220/288 |
| 5,593,166 | 1/1997 | Lovell et al. . | |
| 5,794,806 | 8/1998 | Harris | 220/203.26 |
| 5,862,936 | 1/1999 | Johanson | 220/304 |

*Primary Examiner*—Anthony Knight
*Assistant Examiner*—Alison K. Pickard
*Attorney, Agent, or Firm*—Robert T. Johnson

[57] ABSTRACT

This invention discloses, as a manufacture, a vehicle O ring fuel cap gasket having a diagonally inverted modified C shape cross section and a groove extending for the full circumference of the O ring and in cross section the groove edges extend downward, with one or first edge extending downward to about 4 o'clock position and the other or second edge extending downward to about 7:30 o'clock, to provide a groove opening extending diagonally upwards for a depth of about 2.2× to about 2.5× the thickness T–T' of the back of the C shape, and optional ridges on the outer circumference, the inner circumference, or the top of the O ring, and the O ring formed of an elastomer having a Shore A hardness about 50 to 60 and ultimate elongation range of 200% to 315%.

4 Claims, 8 Drawing Sheets

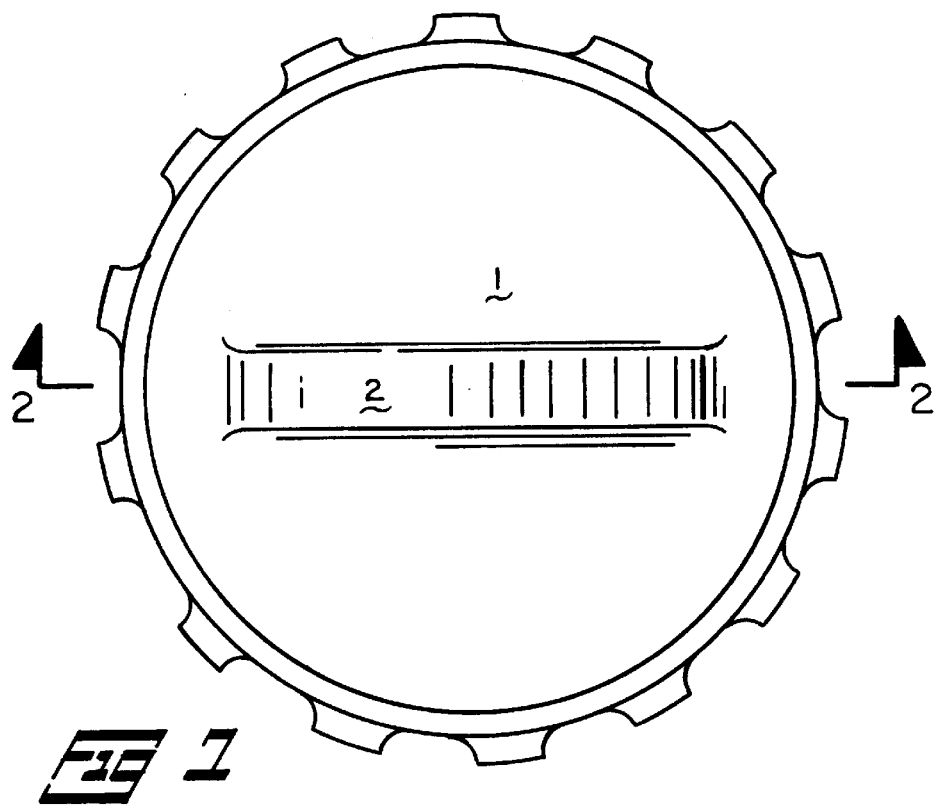
FIG 1
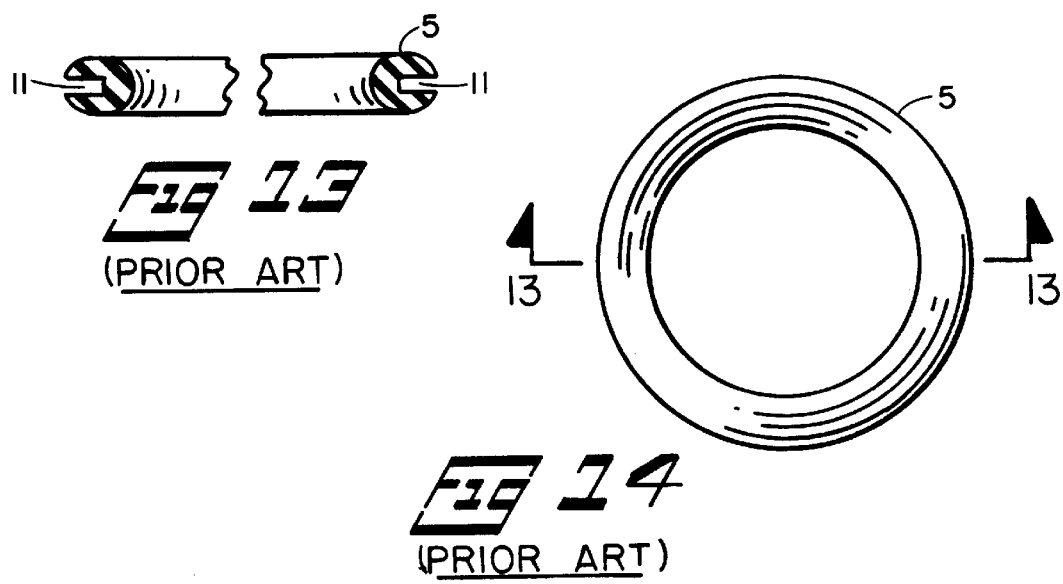
FIG 13
(PRIOR ART)
FIG 14
(PRIOR ART)

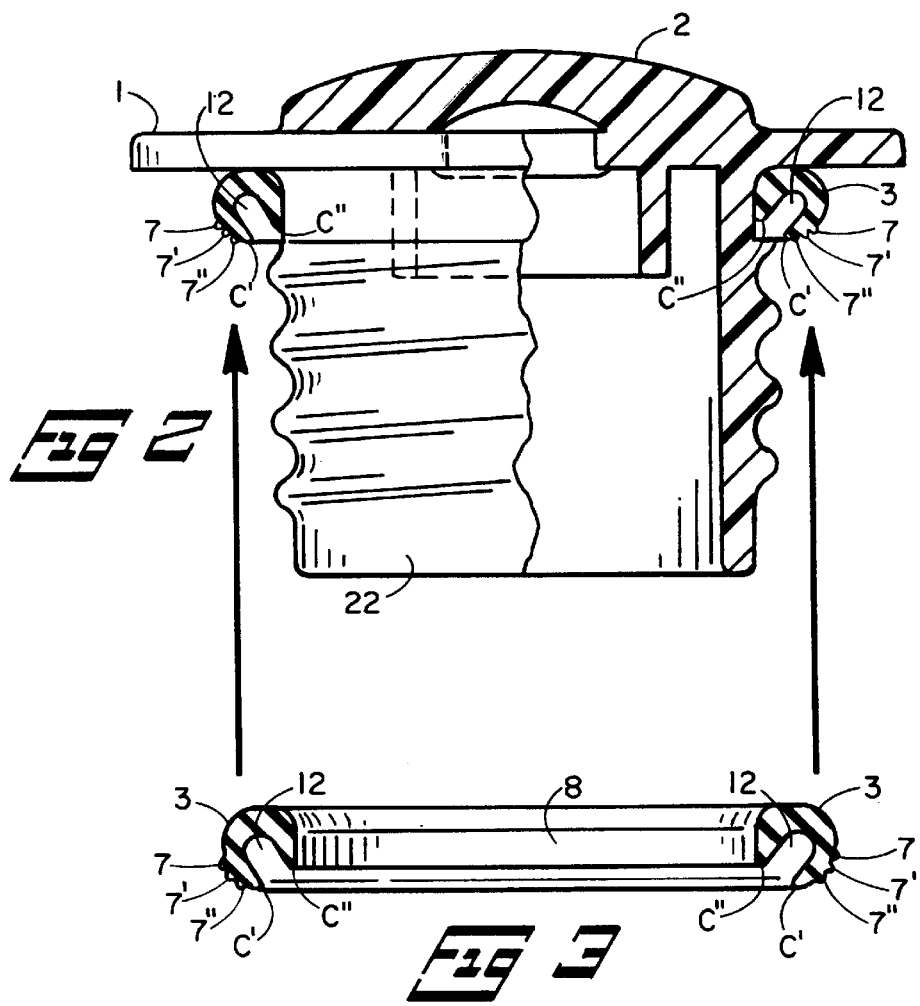
FIG 2
FIG 3
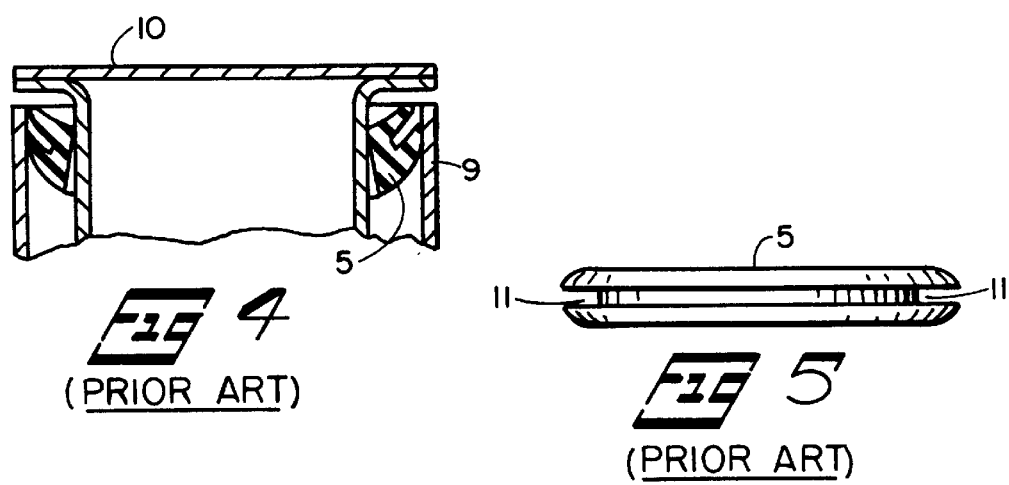
FIG 4
(PRIOR ART)
FIG 5
(PRIOR ART)

DETAIL A
10x SCALE

DETAIL B
10x SCALE

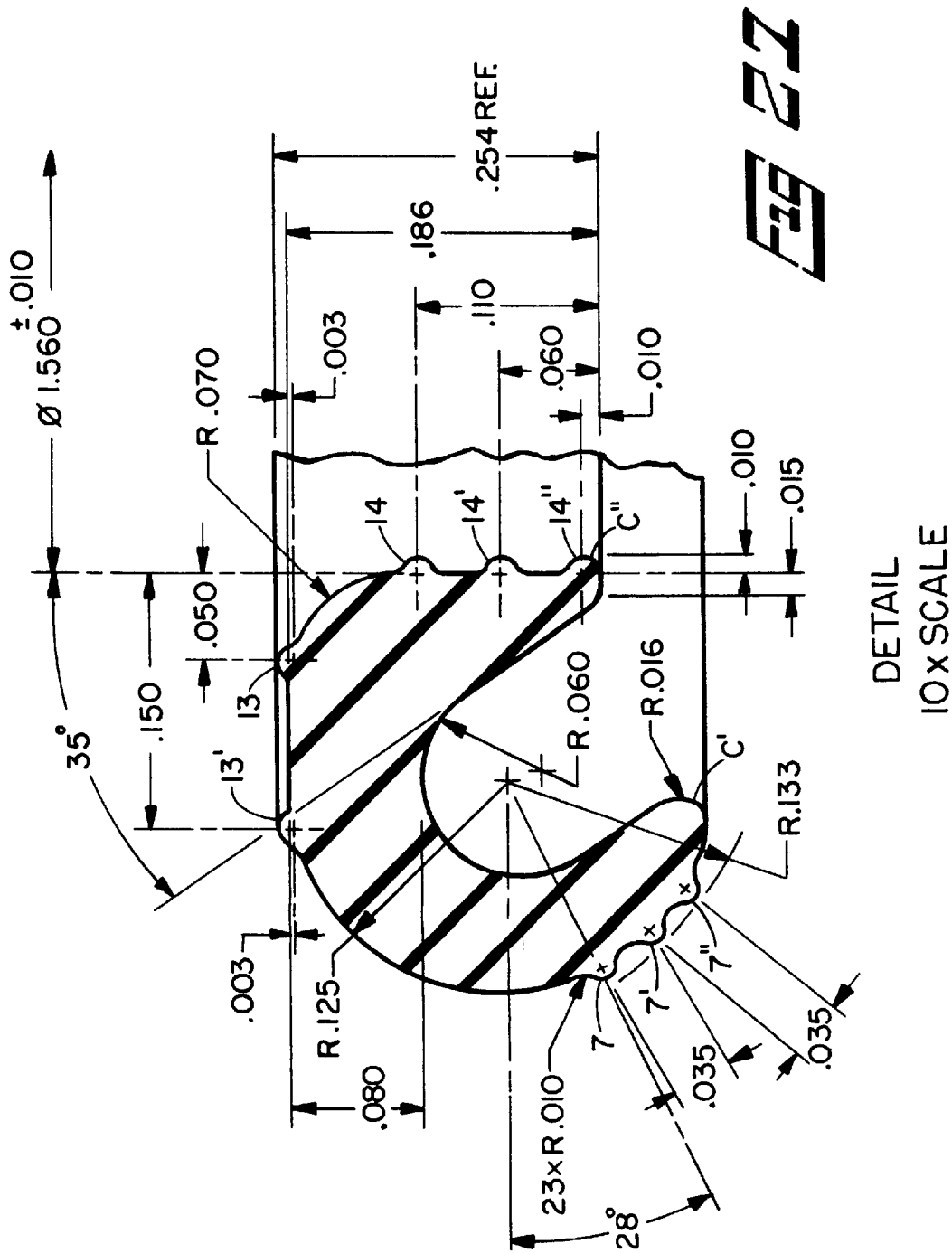

VEHICLE O RING FUEL CAP GASKET

This present invention discloses a vehicle O ring fuel cap gasket having a shape different than the conventional O ring to thus provide a tight seal between the fuel cap and the filler pipe of the vehicle fuel tank.

The prior art is shown in;
U.S. Pat. No. 4,765,505, FIG. 1.
U.S. Pat. No. 4,072,245 FIG. 2, shows the shape of the O ring gasket.
U.S. Pat. No. 4,102,472 FIGS. 2, 5, and 8 shows other O ring shapes.
U.S. Pat. No. 5,499,086 FIG. 2, legend 48 shows another O ring.
U.S. Pat. No. 5,794,806 FIGS. 28, 29, and 30 shows other shapes of fuel tank gaskets.

None of the above prior art patent references disclose the matter claimed in this application.

OBJECTS OF THE INVENTION

An object of this invention is to disclose a vehicle O ring fuel cap gasket having a modified C shape cross section, with the open side of the C extending diagonally downward, and the opening extending from about 4 o'clock to about 7:30 o'clock, and the opening extending diagonally upwards for a distance of about 2.2× the thickness T–T' of the C shape back and ridges on the O ring inner and outer circumferences and top of the O ring. (See FIGS. 15, 16, 17)

A further object of this invention is to disclose a vehicle O ring fuel cap gasket of a modified C shape cross section, and the open groove side of the C extending diagonally downward, and the channel or groove on the open side of the C extending from about 4 o'clock to about 7:30 o'clock, and the channel or groove of the C shape extending diagonally upwards for a distance of about 2.0 to about 2.5× the thickness T–T' of the C shape, and the width of the groove equal to about 1.4× to 1.9× of the T–T' measurement and optional ridges on the outside circumference or the inside circumference or the top of the vehicle O ring fuel cap gasket of this invention. (See FIGS. 10, 17, and 20)

A further object of this invention is to disclose a vehicle O ring fuel cap gasket having a diagonally inverted modified C shape cross section and a groove extending for the full circumference of the O ring and in cross section the groove edges extend downward, with one or first edge extending downward to about 4 o'clock position and the other or second edge extending downward to about 7:30 o'clock, to provide a groove opening extending diagonally upwards for a depth of about 2.2× to about 2.5× the thickness T–T' of the back of the C shape, and optional ridges on the outer circumference, the inner circumference, or the top of the O ring, and the O ring formed of an elastomer having a Shore A hardness of about 50 to 60 and ultimate elongation range of 200% to 315% and the elastomer selected from the group consisting of fluoroelastomer or nitrile rubber, or modifications thereof, of these elastomers.

Another object of this invention is to disclose a vehicle O ring fuel cap gasket seal between a vehicle fuel cap and the vehicle fuel fill pipe, and the O ring gasket pinch lips extend inward toward the fuel cap stem body.

All of the embodiments of the vehicle fuel cap O ring of this invention will provide a tight seal when mounted between a vehicle fuel cap and the fill pipe of the vehicle.

BRIEF SUMMARY OF THE INVENTION

This invention discloses and claims a Vehicle O ring fuel cap gasket having an inverted C shape, and a groove opening in cross section extending from about 4 o'clock to about the 7 o'clock position, and optionally there may be ridges on the outer circumference, and on the inner circumference, and on the top surface of the O ring gasket, This gasket has utility for a vehicle fuel cap seal on the fuel fill pipe of a vehicle. A fluoroelastomer, nitrile rubber, or modifications thereof, having a Shore A hardness of 50–60, and ultimate elongation of about 200% to about 350% are preferred materials for the O rings of this invention.

BRIEF DESCRIPTION OF DRAWINGS

FIG. 1—Plan view of top of vehicle fuel cap.
FIG. 2—Cross section view of vehicle fuel cap and vehicle O ring fuel cap gasket, of this invention, in place.
FIG. 3—Cross section of vehicle O ring fuel cap gasket, and ridges thereon.
FIG. 4—Cross section of prior art vehicle fuel cap gasket fitting between fuel cap and filler pipe.
FIG. 5—Edge view of prior art vehicle fuel cap gasket.
FIG. 13—Cross section of prior art vehicle fuel cap gasket.
FIG. 14—Plan view of prior art vehicle fuel cap gasket.
FIG. 21—Typical cross section approximate dimensions of the embodiments of the vehicle O ring gas cap gasket, of this invention.

LEGENDS OF DRAWINGS

1—Vehicle fuel cap top plan view.
2—Top ridge of fuel cap.
3, 3', 3"—Embodiments of vehicle O ring fuel cap gasket of this invention.
4—Vehicle fuel cap body; thread section.
5—Prior art gasket.
6—Fuel tank fill pipe.
7, 7', 7"—Ridges on outer circumference of vehicle O ring fuel cap gasket of this invention.
8—Vertical inside diameter wall section in embodiments of vehicle O ring fuel cap gasket of this invention.

9—Prior art fill pipe.
10—Prior art cap.
11—Groove in prior art gasket.
12—Groove or channel in Vehicle O ring fuel cap gasket in all embodiments of this invention.
13,13'—Concentric ridges, in second embodiment, on top surface of vehicle O ring fuel gasket.
14,14',14"—Ridges on inner circumference of second embodiment of vehicle O ring fuel cap gasket, of this invention.
15—Outer convex surface of circumference of second embodiment of vehicle O ring fuel cap gasket, of this invention.
16—Top surface of second embodiment of vehicle O ring fuel cap gasket.
17—Top surface of first embodiment of fuel cap gasket, of this invention.
18—Outer convex surface of circumference of first embodiment of fuel cap gasket of this invention.
19—Inside diameter of straight side wall section in second embodiment of new fuel cap gasket of this invention.
20—Top surface of third embodiment of vehicle O ring fuel cap gasket, of this invention.
21—Outer convex surface of circumference of third embodiment of vehicle O ring fuel cap gasket of this invention.
22—Fuel cap stem body.
C"—4 o'clock position first groove edge.
C'—7:30 o'clock position second groove edge.
A—Angle 30°–40°
T—T' Cross section thickness of top of O ring.
W—Width of groove in vehicle O ring fuel cap gasket, of this invention.
D—Depth of groove in vehicle O ring fuel cap gasket

DETAILED DESCRIPTION OF INVENTION

Figure 8:
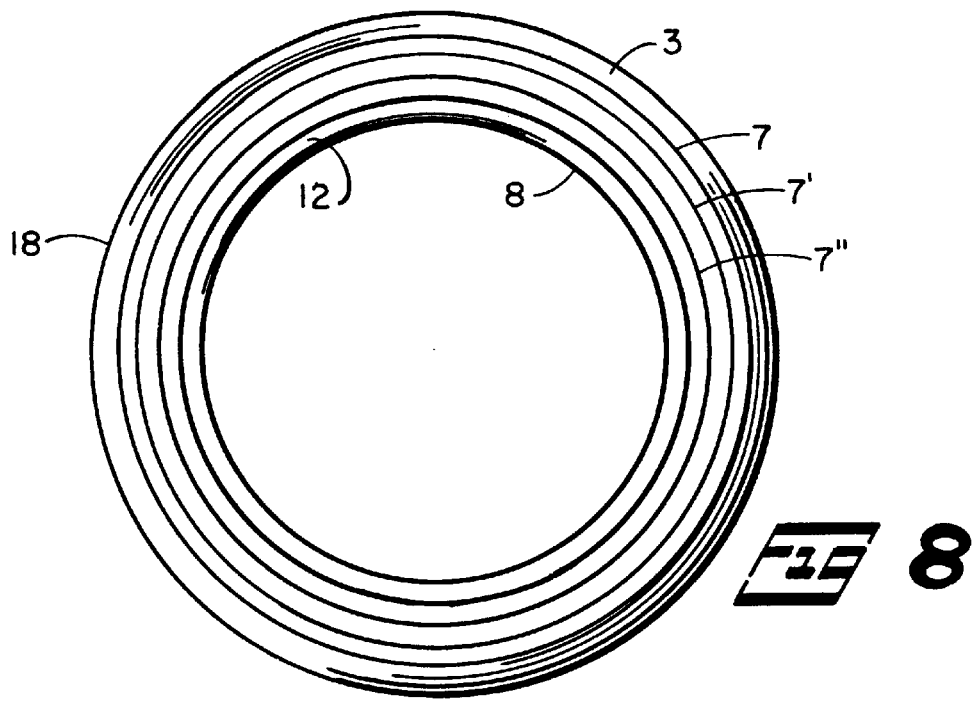
FIG. 8—Plan view of concave, or bottom, side of new vehicle O ring gasket of this invention.
Figure 9:
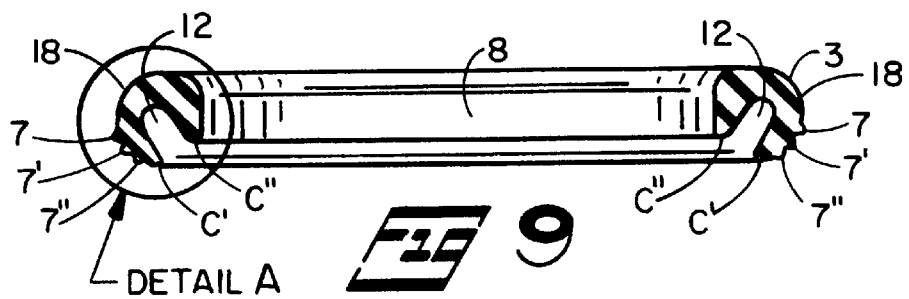
FIG. 9—Cross section detail elevational view of new vehicle O ring gas cap gasket of this invention.
Figure 10:
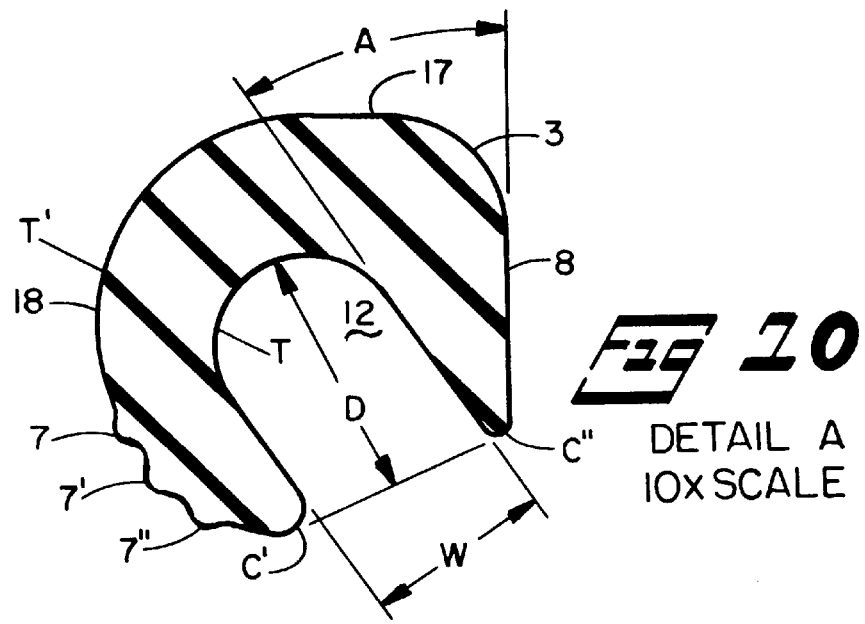
FIG. 10—Enlarged detail cross section of a first embodiment of new vehicle O ring fuel cap gasket.
Figure 15:
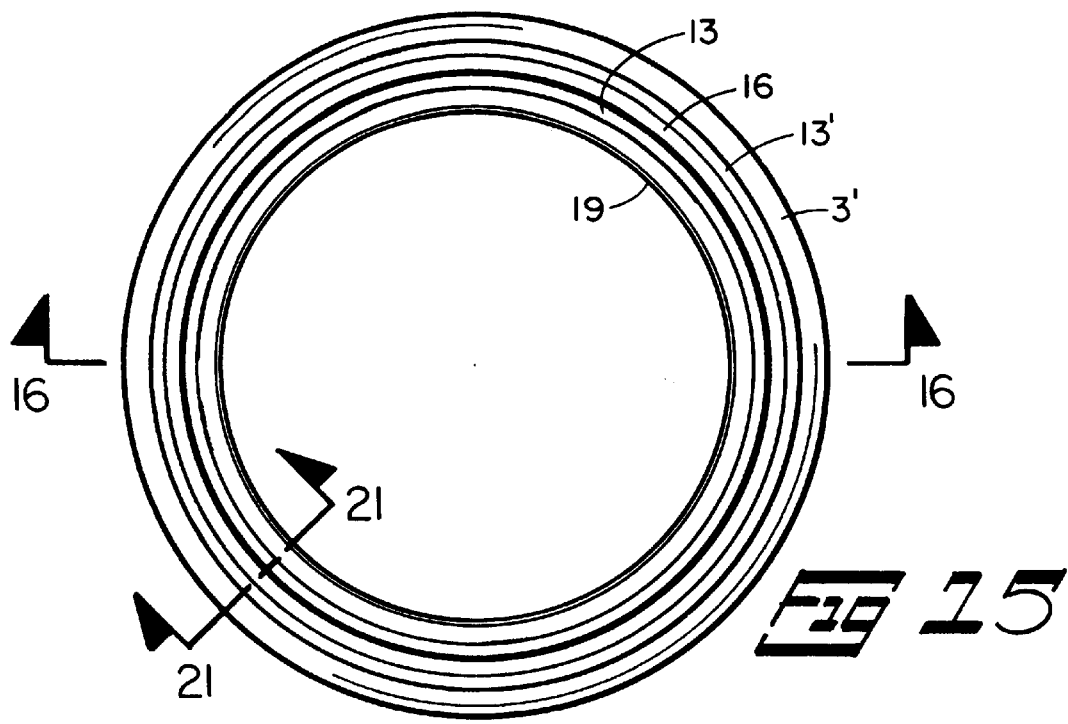
FIG. 15—Plan view of another, or second embodiment of vehicle O ring fuel cap gasket.
Figure 16:
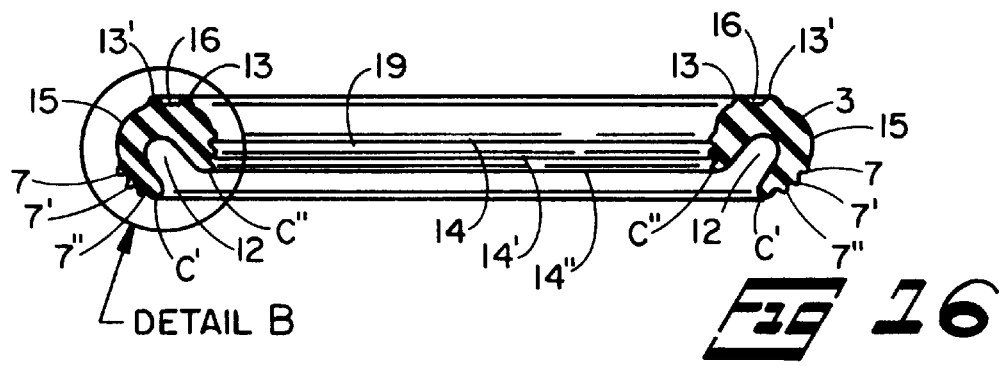
FIG. 16—Cross section elevation view of second embodiment of vehicle O ring fuel cap gasket, of this invention.
Figure 17:
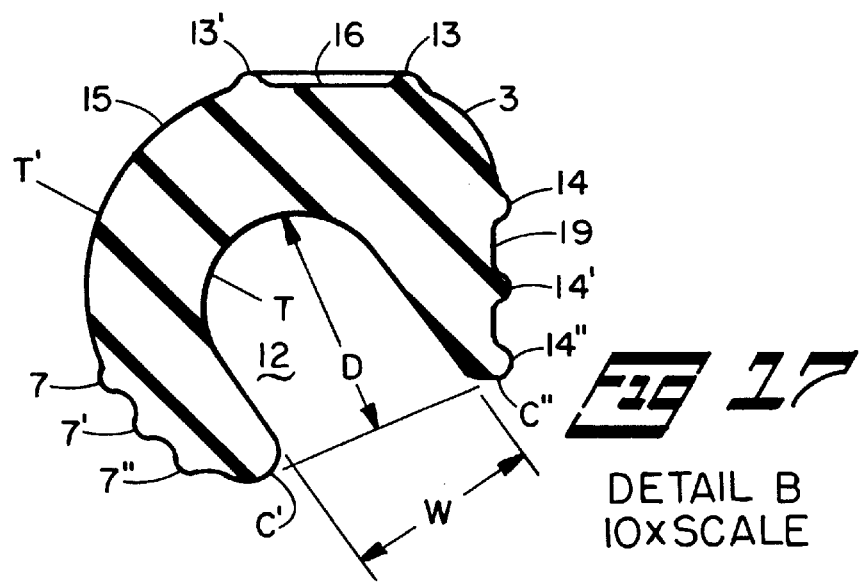
FIG. 17—Enlarged detail cross section of second embodiment of vehicle O ring fuel cap gasket, of this invention.
Figure 18:
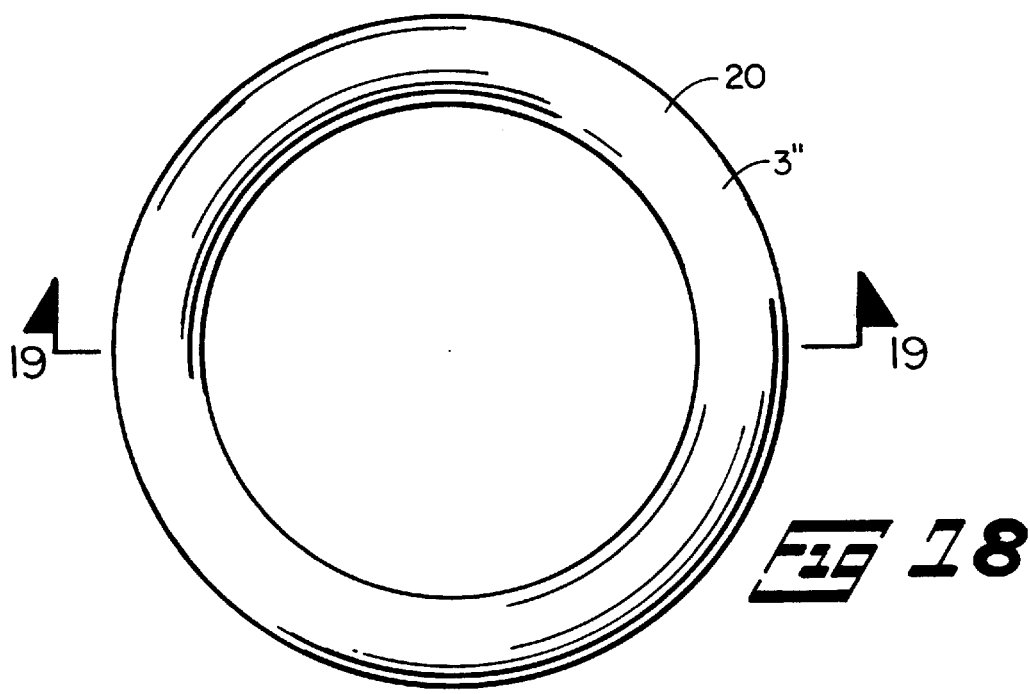
FIG. 18—Plan view of another, or third, embodiment of vehicle O ring fuel cap gasket.
Figure 19:
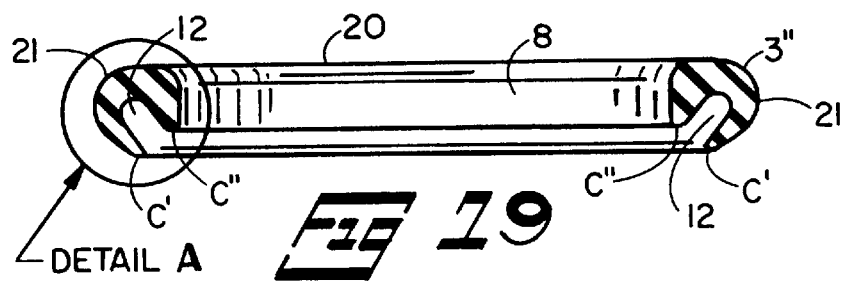
FIG. 19—Cross section view of third embodiment of vehicle O ring fuel cap gasket.
Figure 20:
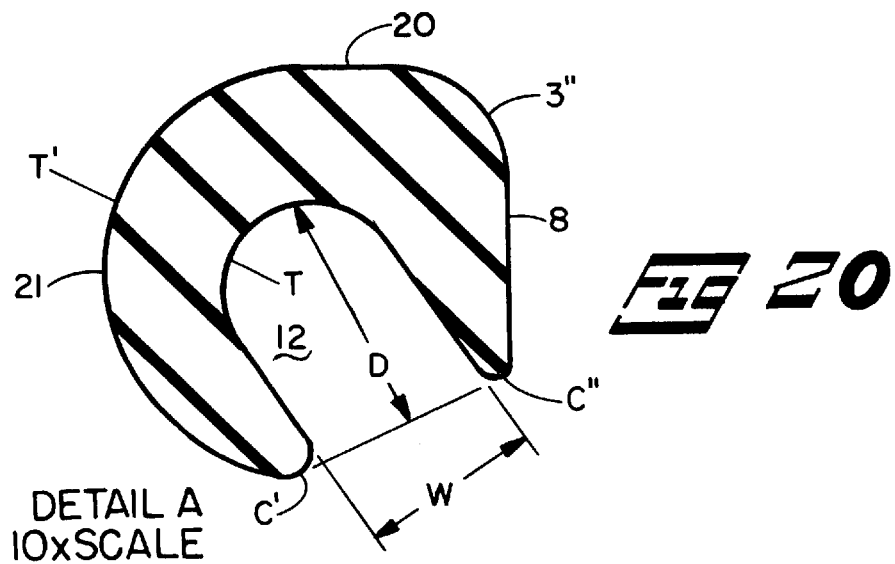
FIG. 20—Enlarged detail of cross section of third embodiment of vehicle O ring fuel cap gasket.

This invention discloses and claims an O ring gasket 3 having a configuration of a diagonally partly inverted C shape in cross section, see FIGS. 8, 9, and 10, and a second embodiment 3' see FIGS. 15, 16, and 17 and a third embodiment 3" see FIGS. 18, 19, and 20, and as shown in cross sections FIGS. 9, 10, 16, 17 and 19, 20 a groove or channel 12, best shown in cross sections FIGS. 10, 17, and 20 and the space between the edges of groove 12 extending from about 4 o'clock to about the 7 o'clock position. Legend 12 is a groove in the O ring gasket of this invention, and there may be ridges 7, 7', 17", (see FIG. 10) on the outer circumference, in one embodiment of this invention, in another embodiment (see FIG. 17) there are ridges 7, 7', 7", and 13, 13' and 14, 14', 14". On another embodiment there are no ridges (see FIG. 20). All of these embodiments are to provide an improved vehicle O ring fuel cap gasket seal on the fuel fill pipe of a vehicle.

Referring now to the drawings FIG. 1 is a plan view of the top of vehicle gas or fuel cap 1, and FIG. 2, is a cross section view of the gas cap 1, and top ridge 2 of gas cap 1, and new O ring gasket 3, of this invention in position just under the top 1 as conventionally mounted on a gas cap.

FIG. 3 is a cross section as a first embodiment of this invention of vehicle O ring fuel cap gasket 3, and the inside diameter legend 8 shows a straight side wall section in the embodiments of this invention, and this O ring, having 7, 7' and 7" concentric ridges on the outside circumference periphery, located at about 7:30 o'clock to 8:30 o'clock location as shown in detail A, 10× scale, in FIG. 10. These concentric ridges 7, 7', 7" are shown in FIG. 8, plan view of concave, or bottom side, of this new O ring 3, and extend completely around the outer periphery circumference of the O ring 3, of this invention.

For comparative purposes prior art gaskets are shown in FIGS. 4, 5, 13 and 14. FIG. 4 shows the gasket 5 in position between the cap 10 and the fill pipe 9. The prior art gasket 5 is shown in edge view FIG. 5, and shows a groove 11 around the outer circumference. FIG. 13, is a cross section of prior art vehicle fuel cap gasket 5, showing the groove 11, in the prior art gasket.

Figure 6:
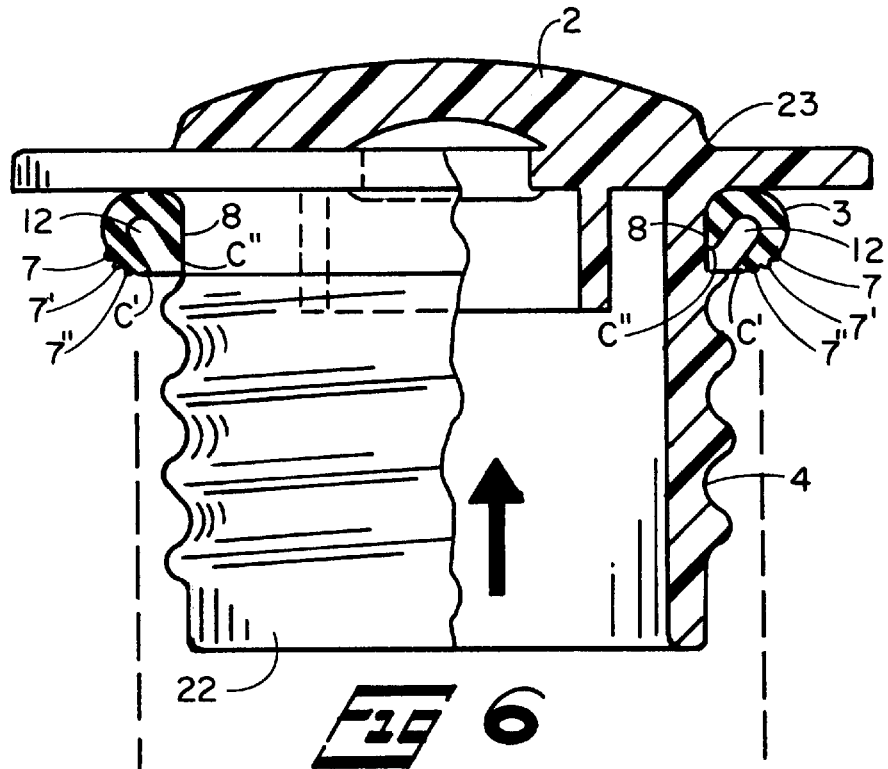
FIG. 6—Cross section view of vehicle O ring fuel cap gasket, of this invention, fitting on fuel cap.
Figure 7:
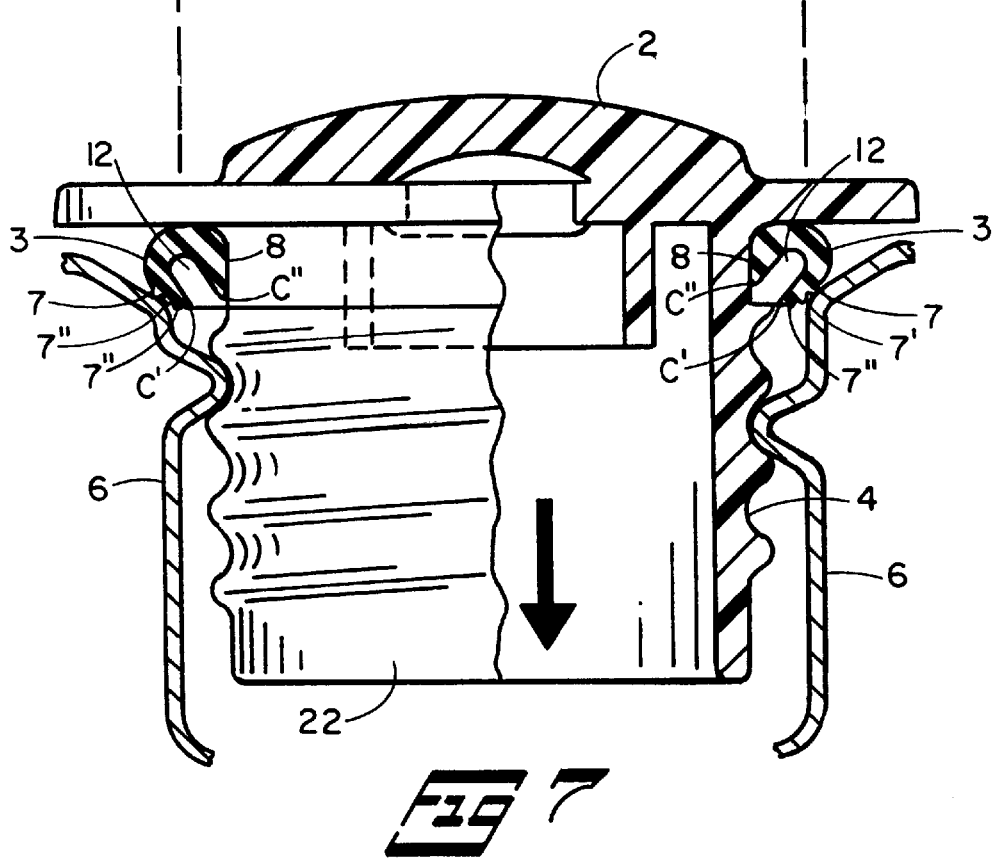
FIG. 7—Fuel cap and new vehicle O ring gas cap gasket of this invention fitting in fill pipe of vehicle.

FIG. 6 shows the vehicle O ring fuel cap gasket 3 of this invention, mounted on the body section 22 of a gas cap and under the vehicle fuel cap top 1. FIG. 7, shows fuel cap 22 and vehicle O ring fuel cap gasket 3, mounted on the fuel cap 22, and this assembly mounted in the fuel cap fill pipe 9. FIGS. 6 and 7 are shown connected by dash lines to indicate the fuel cap 22 is removable from the fill pipe.

Referring now to FIG. 8, showing the plan view of the concave 12, bottom, side of vehicle O ring fuel cap gasket 3, of this invention, and showing 7,7',7" concentric ridges in first embodiment of vehicle O ring fuel cap gasket 3, of this invention. FIG. 9, is a cross section of first embodiment of vehicle O ring fuel cap gasket 3 of this invention showing concentric ridges 7, 7',7", and outer convex surface of circumference 18 of the first embodiment of the fuel cap gasket of this invention, and top surface 17 and groove 12 in the under side and extending for the full diameter of the O ring gasket of this invention.

FIG. 10 is an enlarged detail cross section of the first embodiment 3 of the vehicle O ring fuel cap gasket of this invention, and shows the thickness T–T' and width W of groove 12. The thickness T–T' is about 0.64× the width W of groove 12. Angle A ranges from about 30° to about 40° and is the angle from straight side wall section 8 in embodiments of the vehicle O ring fuel cap gasket 3, 3',3" of this invention at point C" 4 o'clock position. C' is the 7:30 o'clock position of the leg of the diagonally mounted inverted C shape as shown in this FIG. 10, and concentric ridges 7, 7', 7" in all embodiments are shown.

Figure 11:
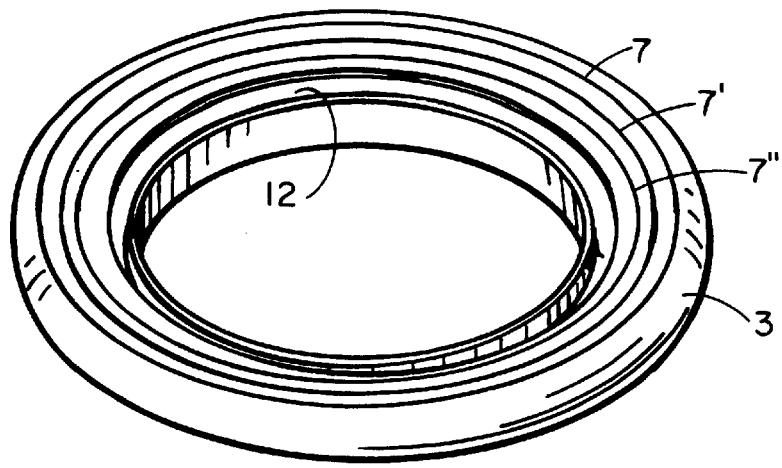
FIG. 11—Isometric view of embodiment of vehicle 0 ring fuel cap gasket of this invention.

FIG. 11 is an isometric view of the bottom of the O ring gasket 3 of this invention, and shows the concentric ridges 7,7',7" and straight side wall section 8 and groove 12 in this O ring gasket.

Figure 12:
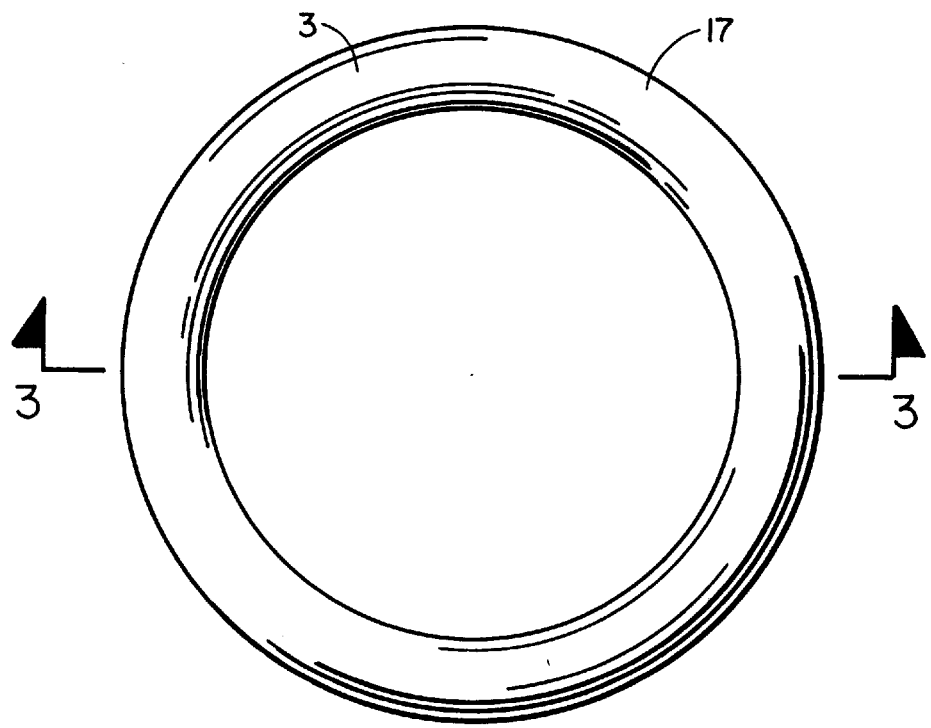
FIG. 12—Plan view of top side of new vehicle O ring fuel cap gasket, of this invention.

FIG. 12 is top plan view 17, of first embodiment of the vehicle O ring fuel cap gasket of this invention.

Another embodiment of this invention is shown in FIG. 15, where 3' is an embodiment of the vehicle O ring fuel cap gasket, and 13, 13' are concentric ridges on the top surface 16 of second embodiment of this invention, and ridges 14, 14', 14" on the inner circumference surface 19 straight side wall section in this second embodiment of the invention.

FIG. 16 is a cross section elevation view of second embodiment of vehicle O ring fuel cap gasket of this invention, and shows ridges 7, 7' and 7" positioned on the outer convex surface of circumference 15, of second embodiment of vehicle O ring fuel cap gasket, of this invention and concentric ridges 13, 13' are shown on the top surface 16 of the embodiment of this invention, and ridges 14, 14' and 14" are located on the inside diameter 19, straight side wall section in this second embodiment, and a groove 12 in vehicle O ring fuel cap gasket, in all embodiments of this invention. Detail B cross section is shown circled and shown in enlarged (10×) detail in FIG. 17 to more clearly show the position of ridges 7, 7' 7" and 13, 13" and 14, 14', 14" and inside diameter straight side wall 19 section, further W is the width of the groove 12, and T–T' is the thickness of the wall indicated at 15, and the thickness T–T' is equal to about 0.5 to 0.6× the width W of groove 12 in the O ring of this invention. The legends C" and C' indicate positions of about 4 o'clock and 7:30 o'clock respectively, of the relationship of the groove 12 edges on the bottom of the O ring of this invention.

FIG. 18 shows 3" plan view of another, or third embodiment of vehicle O ring fuel cap gasket of this invention, which shows 20 top surface of plan view of third embodiment of this invention. FIG. 19—cross section view of third embodiment 3" of this invention of vehicle O ring fuel cap gasket showing, 20 top surface of this embodiment and outer convex surface 21 circumference, and 12, groove in vehicle O ring fuel cap gasket of this invention. Detail A is circled and an enlarged section of this detail section is shown in FIG. 20, which shows Detail A (10×).

FIG. 20 enlarged detail A (10×) of cross section of this third embodiment 3" of the O ring of this invention shows 20 top surface of O ring of this invention and, 21 outer convex surface of circumference of third embodiment of this invention, and legend 8 vertical inner side wall extending downward to C at the 4 o'clock position, and outer convex side wall 21 extending downward to C' about 7:00 o;clock position and a groove 12 in the O ring of this invention and W indicates the width of groove 12 and T–T' is cross section thickness, and the ratio of T–T' to W is the same as stated above.

FIG. 21 is a detail (10×) cross section view showing the approximate dimensions of the above described ridges, and other dimensions for the vehicle O ring fuel cap gasket of this invention. These dimensions can be varied to compensate for various size fitting requirements.

The diameter of the O ring of this invention is variable to fit the requirements of a fuel cap as needed.

The height of the ridges 7,7',7", 13, 13', and 14, 14', 14" are about 0.008" to 0.015".

To more clearly describe the O ring gasket of this invention of a vehicle O ring fuel cap gasket having a modified C shape cross section, and the open groove 12 side of the C shape extending diagonally downward, and the channel or groove 12, on the open side of the C extending from about 4 o'clock to about 7:30 o'clock, and the channel or groove 12 of the C shape extending diagonally downward for a depth D for a distance of about 2.0× to about 2.5× the thickness T–T' of the C shape, and the width W of the groove 12 equal to about 1.4× to 1.9× of the thickness T–T' dimension.

The above dimensional relationship is to insure flexibility of the vehicle O ring fuel cap gasket of this invention when installed as a gasket between the vehicle fuel cap and the vehicle fuel fill pipe.

Fluoroelastomer, nitrile rubber or modifications thereof of either of these having a Shore A hardness (per ASTM D2240) of 50–60, and ultimate elongation (per ASTM D412) of about 200% as a minimum to about 315% are preferred materials for the O rings of this invention, however other materials meeting the above hardness values and ultimate elongation may be suitable for such vehicle O ring fuel cap gasket as herein disclosed.

The embodiments of the O ring of this invention, discussed above, provide the best mode for a seal between a vehicle fuel cap and the fill pipe of a vehicle fuel tank.

In the above discussion, the words "groove" and "channel", may be used as equivalent alternates.

The purpose of the "ridges" are to provide better contact with any irregular surface on either the fuel cap 1, or the fuel tank fill pipe 6.

In the above discussion many references are made to the "cross section" of the "O ring" of this invention, which serves to better describe and show this invention.

What is claimed is:

1. As an article of manufacture a vehicle O ring fuel cap gasket, wherein the improvement comprises;
   a—said vehicle O ring fuel cap gasket having a diagonally inverted modified C shape in cross section and,
   b—a groove channel extending for the full circumference of said O ring and,
   c—in cross section said groove channel having edges extending downward and,
   d—a first edge of said groove channel extending downward to about 4 o'clock position and second edge of said groove channel extending downward to about 7:30 o'clock and,
   e—said groove channel extending diagonally upwards for a depth of about 2.2× to about 2.5× the thickness T–T' of said C shape and,
   f—said O ring formed of an elastomer having a Shore A hardness of about 50 to 60 and ultimate elongation range of 200% to 350% and,
   g—said elastomer selected from the group consisting of fluoroelastomer and nitrile rubber.

2. A vehicle O ring fuel cap gasket of claim 1 wherein further improvement comprises;
   a—a plurality of parallel ridges on the outer circumference surface of the O ring and,
   b—two concentric ridges positioned on top surface of said O ring and
   c—a plurality of said ridges parallel each to the other, and to the circumference positioned on said O ring inside vertical wall circumference.

3. A vehicle O ring fuel cap gasket wherein the improvement comprises;
   a—an O ring having a diagonally inverted modified C shape in cross section and,
   b—a vertical inside diameter wall section edge of said O ring diagonally inverted C shape in cross section extending downward to about a 4 o'clock position and,
   c—an outer surface edge of said O ring diagonally inverted C shape in cross section, extending downward to about a 7:30 o'clock position, and
   d—said O ring formed of an elastomer having a Shore hardness of about 50 to about 60, and ultimate elongation range of 250% to 315%.

4. A vehicle O ring fuel cap gasket wherein the improvement comprises;
   a—an O ring having a diagonally inverted modified C shape in cross section and,
   b—a vertical inside diameter wall section edge of said O ring diagonally inverted C shape cross section extending downward to about 4 o'clock position and,
   c—an outer surface edge of said O ring inverted C shape extending downward, in cross section to about a 7:30 o'clock position and,
   d—ridges on the outer circumference surface of said O ring and,
   e—said ridges parallel each to the other, and to the circumference of the O ring and
   f—said ridges extending in height from about 0.008" to about 0.015" from said outer circumference surface of said O ring,
   g—said vehicle O ring fuel cap gasket formed from an elastomer selected from the group consisting of fluoroelastomer and nitrile rubber.

* * * * *